United States Patent [19]

Hayashida et al.

[11] Patent Number: 5,260,631
[45] Date of Patent: Nov. 9, 1993

[54] SPINDLE POSITION/SPEED CONTROL UNIT

[75] Inventors: Takahiro Hayashida; Hiroaki Okachi; Mahito Unno, all of Aichi, Japan

[73] Assignee: Mitsubishi Denki K.K., Tokyo, Japan

[21] Appl. No.: 537,719

[22] Filed: Jun. 14, 1990

[30] Foreign Application Priority Data

Jun. 22, 1989 [JP] Japan .................. 1-159993

[51] Int. Cl.$^5$ .............................. G05B 11/18
[52] U.S. Cl. ..................... 318/594; 318/602; 318/799; 318/811
[58] Field of Search ............... 318/560, 561, 569–571, 318/590, 591, 592, 594, 599–603, 798–812; 388/811, 815, 902

[56] References Cited

U.S. PATENT DOCUMENTS

| 3,663,880 | 5/1972 | Gabor . | |
|---|---|---|---|
| 4,206,392 | 6/1980 | Shimajiri et al. | 318/596 X |
| 4,215,300 | 7/1980 | Schmidt . | |
| 4,215,301 | 7/1980 | Mason . | |
| 4,227,134 | 10/1980 | Haner . | |
| 4,345,192 | 8/1982 | Kohzai et al. | 318/653 X |
| 4,347,470 | 8/1982 | Kohzai et al. | 318/594 X |
| 4,359,676 | 11/1982 | Fujioka | 318/653 |
| 4,374,350 | 2/1983 | Kohzai et al. | 318/616 X |
| 4,379,987 | 4/1983 | Kohzai et al. | 318/571 X |
| 4,398,138 | 8/1983 | Kohzai et al. | 318/561 X |
| 4,450,393 | 5/1984 | Kohzai et al. | 318/592 |
| 4,689,528 | 8/1987 | Watanabe . | |
| 4,689,540 | 8/1987 | Tani et al. | 318/608 |
| 4,724,369 | 2/1988 | Hashimoto | 318/561 |
| 4,800,325 | 1/1989 | Nakanishi | 318/661 |
| 4,810,941 | 3/1989 | Ohishi et al. | 318/592 X |

FOREIGN PATENT DOCUMENTS 2388640  4/1978  France .

OTHER PUBLICATIONS

Yoram Koren et al., "Numerical Control of a Lathe," IEEE Transaction on Industry and General Applications, vol. IGA-6, No. 2, Mar./Apr. 1970.

Primary Examiner—Paul Ip
Assistant Examiner—David Martin
Attorney, Agent, or Firm—Sughrue, Mion, Zinn, Macpeak & Seas

[57] ABSTRACT

The invention relates to a spindle speed/position control system for use in a numerically controlled machine tool such as a lathe. To improve the measurement of spindle speed and position, detected elements are attached directly to the rotatable spindle. A waveform shaping circuit takes the outputs of speed and position detecting sensors, and outputs a variety of sinusoidal and pulse signals. The sinusoidally varying signals are employed in speed detection while the pulse signals are used for position detection and control.

13 Claims, 10 Drawing Sheets

FIG. 2

| | (1) CONSTRUCTION AND OUTPUT SPECIFICATIONS | (2) EXAMPLES OF APPLICATION |
|---|---|---|
| 2(a) | HOLLOW DETECTED-BODY 12, 13 SENSOR, PRE-AMPLIFIER CIRCUIT 16-1 → 256/rev + Z, 1024/rev + Z | ○ LATHE TURNING<br>○ ORIENTATION<br>○ SYNCHRONOUS SPINDLE OPER.<br>○ SPEED DISPLAY |
| 2(b) | 14, 12, 13, 15 SENSOR SENSOR, PRE-AMPLIFIER CIRCUIT 16-2 → 256/rev + Z, 1024/rev + Z, 90000/rev + Y | ○ (d) + C AXIS |

SPINDLE POSITION/SPEED CONTROL UNIT

BACKGROUND OF THE INVENTION

The present invention is generally directed to a spindle position/speed control unit which utilizes a hollow position/speed detector attachable to the spindle, and more particularly, to a spindle position/speed control unit capable of simplifying the mounting structure of the detector and controlling both the position and speed of the spindle with high accuracy. The invention finds wide applicability in the field of numerically controlled machine tools, notably lathes.

FIG. 3 is a block diagram illustrating the driving system used for the main spindle of a C-axis type machine tool equipped with a conventional numerical control unit. Referring to FIG. 3, numeral 1 designates a numerical control unit; 2, a main spindle drive control unit; 3, an induction motor; 4, a speed detector; 5, a low resolution position detector; 6, a high resolution position detector; 7, the main spindle; 8, a connection gear for the induction motor 3; 9, a connection gear for the position detector 5; 10, a connection gear for the position detector 6; 51, a speed detecting circuit; 54, a low resolution position detecting circuit; and 57, a high resolution position detecting circuit.

Referring again to FIG. 3, a speed command wr* issued from the numerical control unit 1 is output in the form of a 3-phase AC current command via the main spindle drive control unit 2 to the induction motor 3 that in turn rotates so as to follow the command wr*. To improve the follow-up (feedback) properties, a so-called closed-loop is formed, which formation involves the steps of detecting the speed of the induction motor 3 by inputting the output waveforms A of the speed detector 4 into the speed detecting circuit 51 provided in the main spindle drive control unit 2, and feeding back the detected value in the form of wr.

Rotation of the induction motor 3 is transferred via the connection gear 8 to the main spindle 7, thus driving the main spindle 7. The gear ratio of the connection gear is determined depending on the application.

A positional command $\theta r^*$ alternatively issued from the numerical control unit 1 is output as a 3-phase AC current command via the main spindle drive control unit 2 to the induction motor 3, which in turn rotates so as to follow the positional command $\theta r^*$. In this case, for the purpose of improving the positional follow-up properties, a low resolution position closed-loop feed back system is set up, this involving the steps of detecting the position of the main spindle 7 by inputting output waveforms B from the low resolution position detector 5 into a low resolution position detecting circuit 54 incorporated into the main spindle drive control unit 2, and feeding back the detected value in the form of $\theta r_1$.

The position of the main spindle 7 can also be detected by inputting the output waveforms C of the high resolution position detector 6 into a high resolution position detecting circuit 57 provided inside the main spindle drive control unit 2. The detected value is fed back in the form of $\theta r_2$, thus setting up a high resolution position closed-loop.

The operation of this system will now be described. When performing ordinary lathe operations using the main spindle 7, the numerical control unit 1 outputs a speed command wr* corresponding to the desired speed of the main spindle 7, while the main spindle drive control unit 2 operates to make the actual speed wr of the induction motor 3 follow the speed command wr*, the speed wr being detected by the speed detecting circuit 51.

In the case of effecting a C-axis operation (for example, drilling a hole in the workpiece parallel to the rotational axis of the workpiece, or forming a contour on a face of the workpiece), the numerical control unit 1 outputs a positional command $\theta r^*$ corresponding to the desired position of the main spindle 7, while the main spindle drive control unit 2 operates to make the position $\theta r_2$ of the main spindle 7 follow the positional command $\theta r^*$, the position $\theta r_2$ being detected by the high resolution position detecting circuit 57. The C-axis operation thus involves the use of the high resolution detector 6, which has a resolution of about 360,000-pulses/revolution, because positional accuracy as high as 1/1000 degree may be required at the end of the main spindle for these machining operations.

Next, the operation of the position detector 5 will be described. The position detector 5 has a wide variety of applications, as follows:

1. Where the main spindle 7 is brought into an oriented stop operation for the purpose of positioning the workpiece for machining based on mechanical fixing by the insertion of knock pins or the like, the low resolution position detecting circuit 54 detects the position detection value $\theta r_1$ to form a positional loop, thereby stopping the main spindle 7 at the desired position.

2. When the speed of the main spindle 7 is to be displayed on the CRT of the numerical control unit 1, the output waveforms B of the positional detector 5 are input to the numerical control unit 1. The speed of the main spindle is calculated from the waveform variations per unit time in the numerical control unit, and the resulting speed value is displayed on the CRT.

3. When carrying out synchronous operations with other elements or tools, which may operate along other axes, such as in the case of screw cutting (synchronizing rotation with X-axis and Z-axis movements), polygonal machining (synchronizing with a rotary tool spindle), or workpiece transfer or protrusion cutting (synchronizing positionally with a second opposed main spindle of the lathe), which require synchronization between the position of the main spindle 7 and other shafts or spindles, the positional detection value $\theta r_1$ is detected by means of the low resolution position detecting circuit 54. A positional loop is formed so that the detected value $\theta r_1$ follows the main spindle positional command $\theta r^*$ transmitted from the numerical control unit 1, to position-synchronize the main spindle with such other spindles. The position detector 5 typically has a resolution of approximately 1024–4096-pulses/revolution.

Referring again to FIG. 3, in the past there have been employed only a pair of simply constructed connection gears 8 for connecting the induction motor 3 to the main spindle 7. As a matter of course, however, there may be plural pairs of such gears, for driving at differing ratios. For instance, the following three sets of gearing may be used.

| L speed gears | connection gear ratio = 10:1 |
| H speed gears | connection gear ratio = 1:1 |
| C-axis operation gears | connection gear ratio = 100:1 |

It is to be noted that the connection gearing 9 and 10 may be replaced by belts.

As discussed above, when controlling the main spindle for various operations or when effecting the C-axis operation, one of the position detectors or the speed detector may be needed, depending on the respective operation. As a result, a plurality of detectors are mounted at a plurality of locations. For example, as illustrated in FIG. 3, the speed detector 4 is mounted so as to be connected directly to the induction motor 3, while the position detectors 5 and 6 are mounted via the connection gears 9 and 10 on the main spindle 7. (The position detectors 5 and 6 may be accommodated in the same package, as a result of which the single position detector and single connection gear suffice for the arrangement.)

The reason why the connection gears 9 and 10 are located as they are is as follows: The lathe generally provides a bar feeder function, and therefore the main spindle 7 is made hollow to permit the passage of the workpiece to be machined. The positional detectors must not hinder the passage of the workpiece, and hence it is impossible to attach them directly to the main spindle 7. For this reason, in great majority of cases the position detectors are mounted through connection gears 9 and 10 having a gear ratio of 1:1.

SUMMARY OF THE INVENTION

As discussed above, it is required in the prior art that the plurality of detectors be disposed in a plurality of locations, and the main spindle position detectors must be attached through connection gears to the main spindle. Consequently, there arise problems in that the machine considerably increases in dimension (to ensure space for fitting the detectors) and becomes complicated in construction, resulting in a rise in cost. In addition, accuracy is deteriorated due to the fact that the position is detected indirectly (through the connection gears).

The main spindle position/speed control unit according to the present invention comprises: a sensor, disposed adjacent a detected-body attached directly to a main spindle, for detecting motion of the detected-body; and amplifying means for waveform-shaping the signals received from the sensor into a plurality of sine waves and square waves and amplifying these signals, and a control unit which uses the sine waves for speed determination and control, and the square waves for positional determination and control.

BRIEF DESCRIPTION OF THE DRAWINGS

FIG. 2 is a diagram showing the arrangement of the detectors and the operation of a preamplifier according to the present invention;

Throughout the drawings, the same symbols indicate like and corresponding components.

DETAILED DESCRIPTION OF THE PREFERRED EMBODIMENTS

The main spindle position and speed detectors are fitted directly to the main spindle in the invention, which arrangement simplifies the machine structure. The detector signals are waveform-shaped into a plurality of sine waves and square waves, these signals being arbitrarily selectable for use by the control unit.

Figure 1:
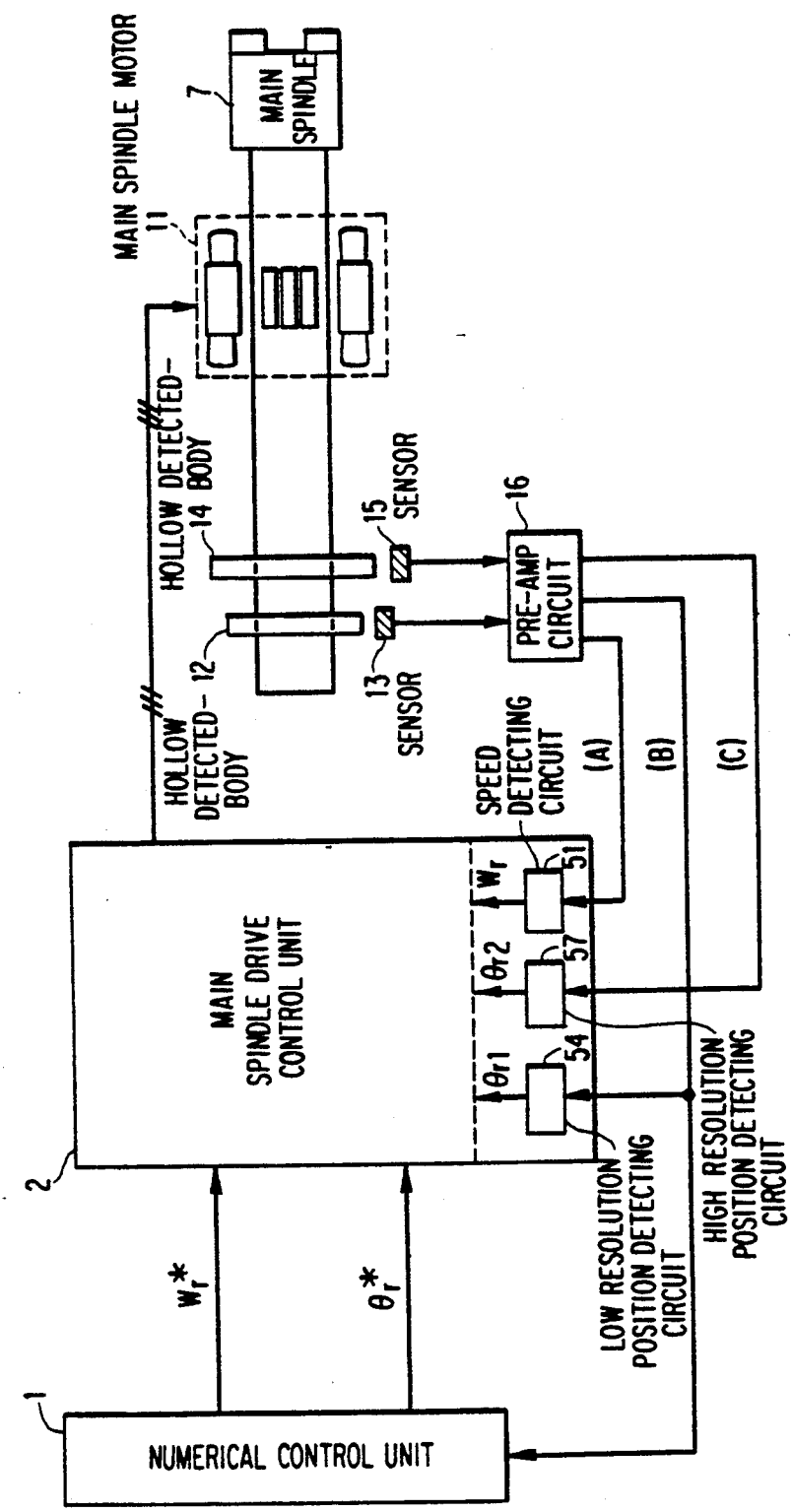
FIG. 1 is a block diagram of an NC machining system, particularly a lathe, including a main spindle and C-axis capability, showing one embodiment of the present invention.
Figure 3:
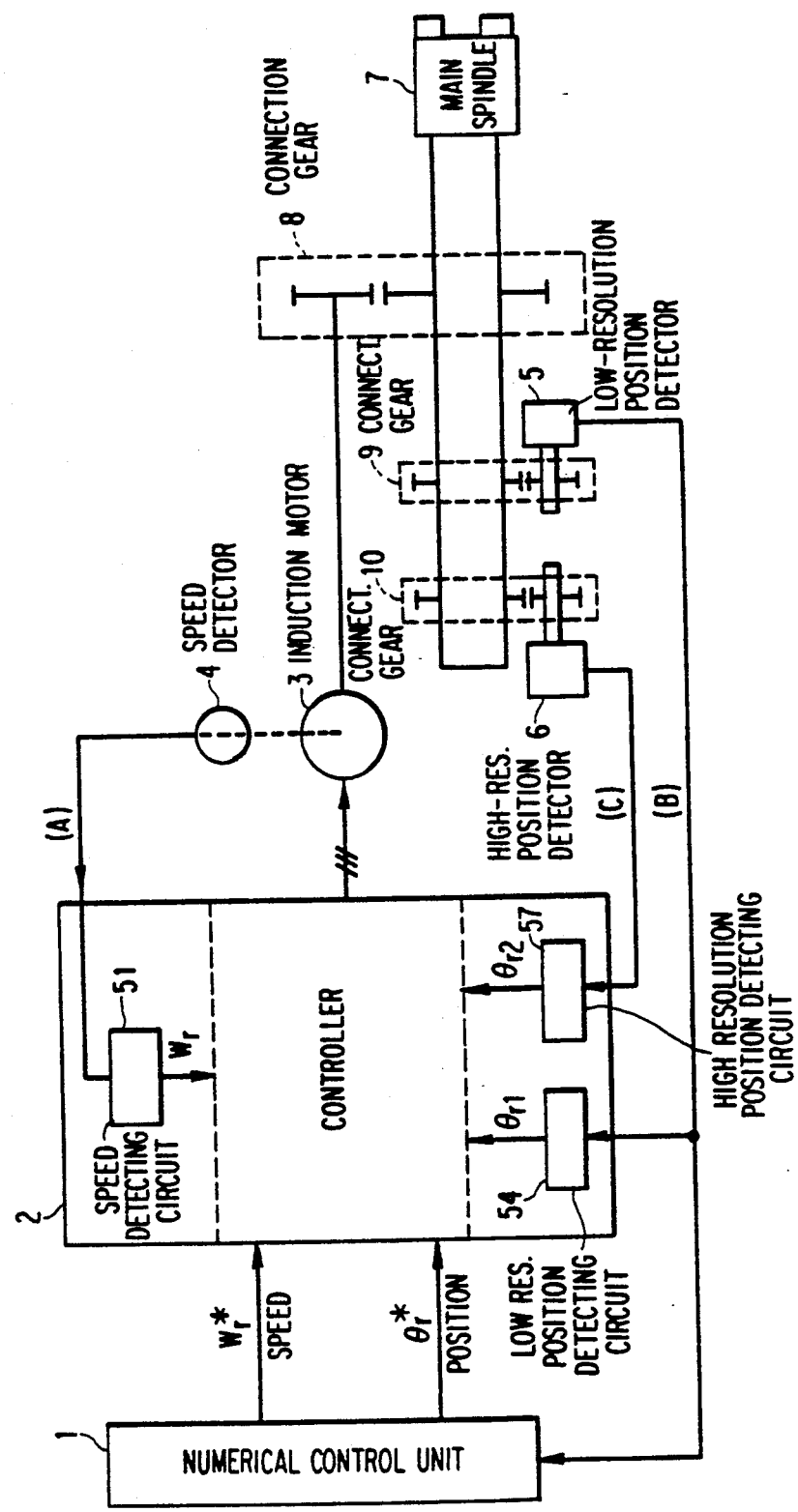
FIG. 3 is a block diagram of a conventional system.

Turning first to FIG. 1, there is shown a block diagram of a driving system for the main spindle of a C-axis type machine tool according to one embodiment of the present invention. In FIG. 1, numerals 1–7, 51, 54 and 57 indicate the same components as those depicted in FIG. 3. Designated at 11 is a built-in main spindle motor having a rotor structure incorporated into the main spindle 7. Numeral 12 denotes a hollow detected-body attached to the main spindle 7 and permitting both speed detection and low resolution positional detection. Numeral 13 represents a sensor for detecting the hollow detected-body 12; 14, a hollow detected-body having the same general structure as that of the detected-body 12 and used for high resolution positional detection; and 15, a sensor dedicated to the hollow detected-body 14. A pre-amplifier circuit generally designated at 16 receives the outputs of the sensors 13 and 15 and outputs them both to the numerical control unit 1 and to the main spindle drive control unit 2 after waveform-shaping the outputs into square waveforms or sine wave signals.

The interior configuration of the pre-amplifier circuit 16 will now be described.

Figure 5:
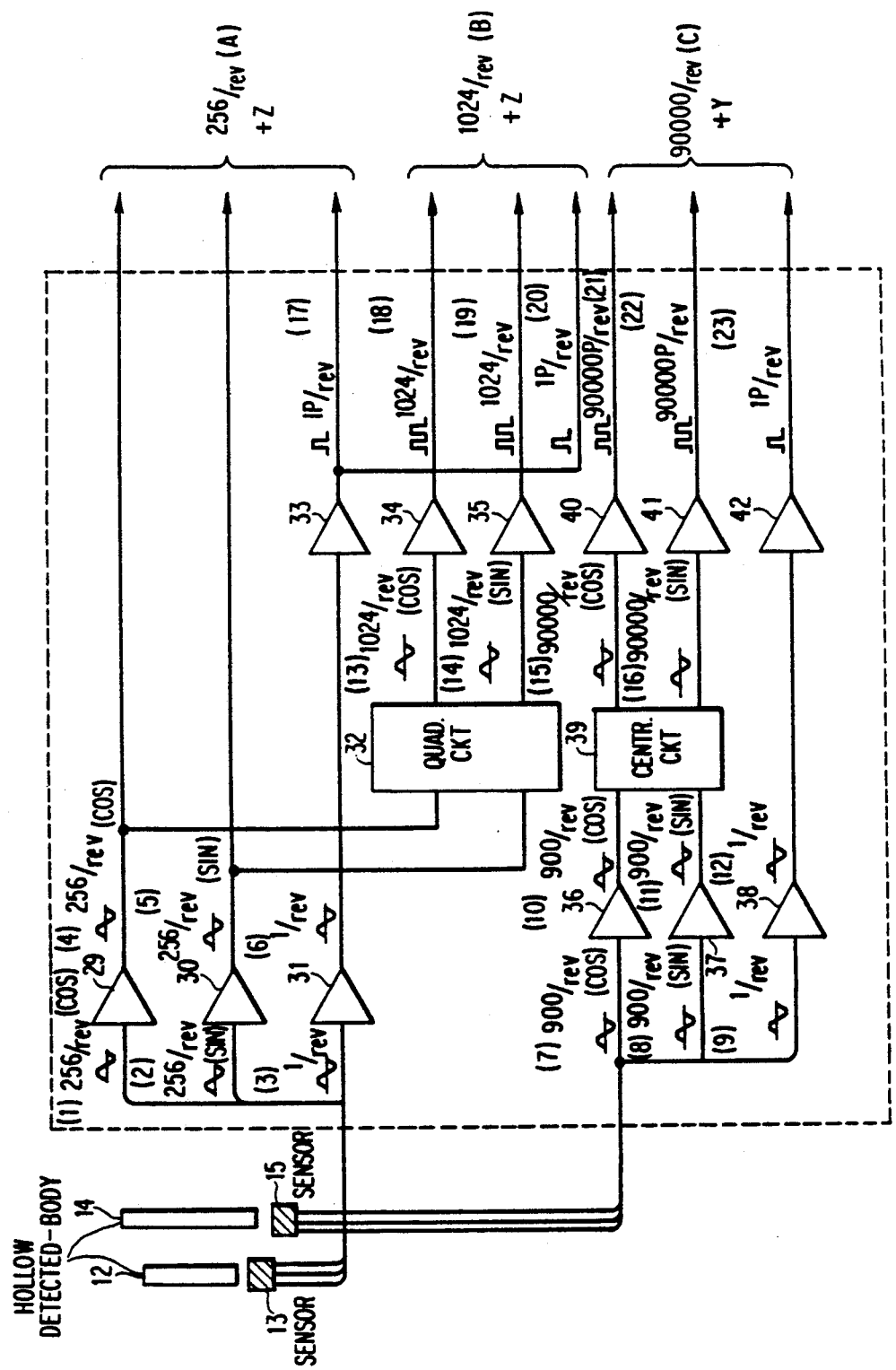
FIG. 5 is a block diagram illustrating a pre-amplifier circuit used with the detectors according to the present invention.

The pre-amplifier circuit 16, as illustrated broadly in FIG. 2, serves to output a plurality of waveforms. FIG. 5 exemplifies the interior configuration of the pre-amplifier circuit 16-2 of FIG. 2(b) (including high resolution circuitry). Referring to FIG. 5, numerals 29–31 and 36–38 denote amplifier circuits; 33–35 and 40–42 comparator circuits; 32 a quadrupling circuit; and 39 a centupling circuit.

The sensor 13 generates three waveforms: COS and SIN waves of 256-waves/revolution and a SIN wave of 1-wave/revolution. The pre-amplifier circuit 16 inputs these three waveforms, and amplifies them until predetermined amplitude values are obtained, via the amplifier circuits 29–31.

Among the three amplified waveforms, the COS and SIN waves of 256-waves/revolution resolution are directly output from the pre-amplifier circuit 16 in the form of speed detecting waveforms. The remaining waveform of 1-wave/revolution is converted into a square wave by means of the comparator circuit 33 and is outputted as a 1-pulse/revolution signal (hereinafter referred to as a Z-phase signal) from the pre-amplifier circuit 16.

The amplified COS and SIN waves of 256-waves/-revolution are also input to a quadrupling circuit 32, by which quadrupled outputs, i.e., COS and SIN waves of 1024-waves/revolution, are obtained. These outputs are inputted to the comparator circuits 34 and 35, wherein they are converted into trains of square waves of 1024-pulses/revolution, with a phase difference of 90° therebetween. The 2-phase square waves, to be employed for the low resolution position detection, become outputs of the pre-amplifier circuit 16.

The sensor 15 generates three waveforms such as COS and SIN waves of 900-waves/revolution and a SIN wave of 1-wave/revolution. The pre-amplifier circuit 16 amplifies these three waveforms, using amplifier circuits 36–38, up to predetermined amplitude values. The waves of 1-wave/revolution are converted into square waves by means of the comparator circuit 42, and are output as a 1-pulse/revolution signal (hereinafter referred to as a Y-phase signal) from the pre-amplifier circuit 16. Inputted to the centupling circuit 39 are the COS and SIN waves of 900-waves/revolution. The signals are centupled therein, viz., COS and SIN waves of 90,000-waves/revolution are obtained. These outputs are input to the comparator circuits 40 and 41, wherein they are converted into trains of square waves, of 90,000-pulses/revolution, which are respectively out of phase by 90°. These signals are output as high resolution positional detection signals.

As may be presumed from the description given above, the pre-amplifier circuit 16-1 depicted in FIG. 2(a) is constructed in the same manner as above, except that, since this unit does not include a high resolution position detector or associated components, the arrangement is such that components 36–42 are omitted.

Note that the Z-phase and the Y-phase signals are provided by separate systems in this embodiment of the invention. Alternatively, the Z-phase signal may be directly output in the form of the Y-phase signal.

The description will next describe how the speed detection value wr and positional detection values $\theta r_1$ and $\theta r_2$ are obtained from the respective output waveforms of the pre-amplifier circuit 16.

First, the manner of obtaining the speed detection value wr will be explained in conjunction with FIG. 9.

Figure 9:
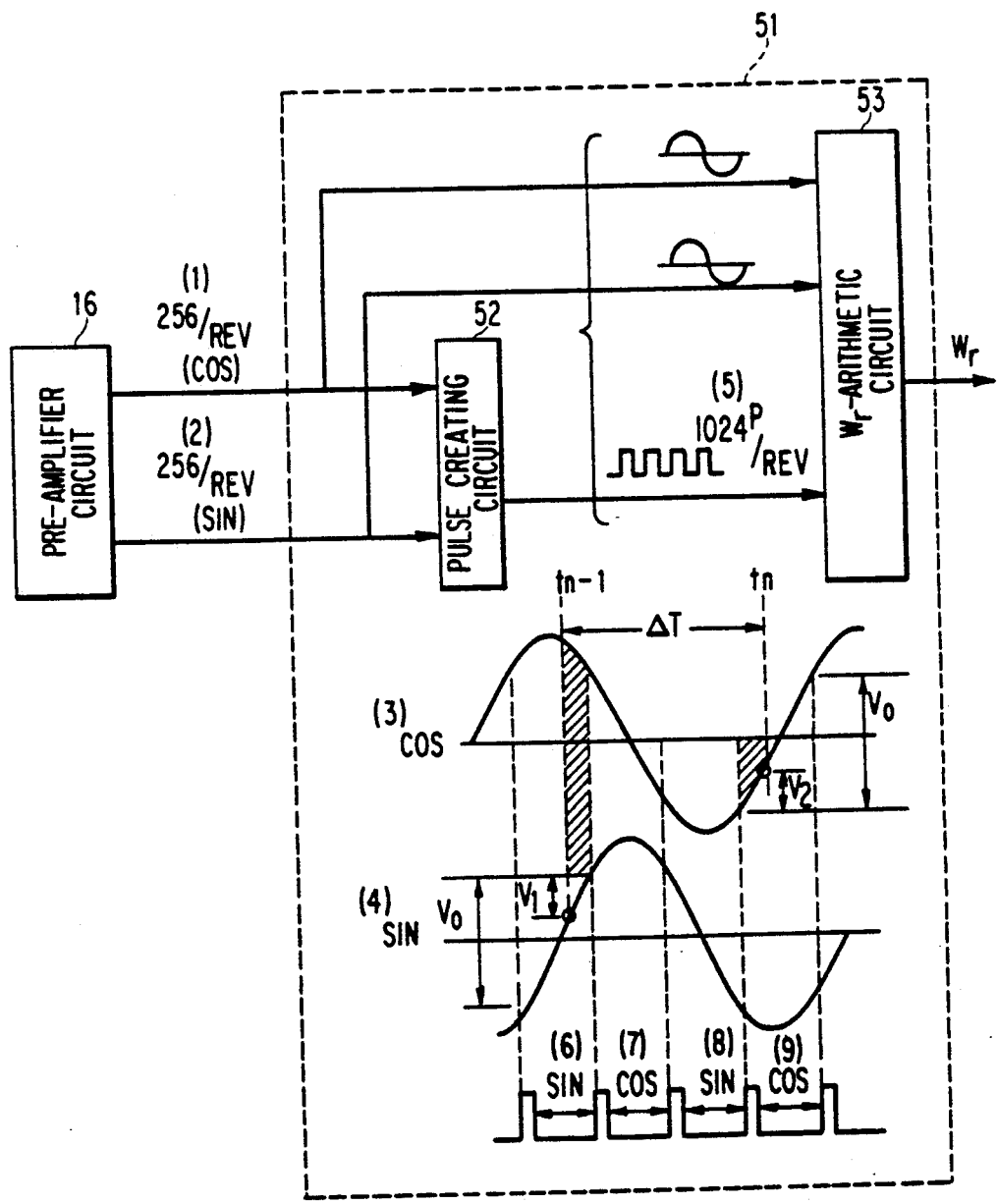
FIG. 9 is diagram explaining the principles of speed detection.

Referring to FIG. 9, numeral 51 represents the speed detecting circuit; 52, a quadrupling pulse generating circuit; and 53, an wr-arithmetic circuit.

In FIG. 9, the 256-wave/revolution COS and SIN waves of the pre-amplifier circuit 16 are pulse-converted by the quadrupling pulse generating circuit 52, in the phase-relation illustrated at the bottom of the figure. Outputs of the preamplifier circuit other than those mentioned are omitted in FIG. 9 for clarity.

The number of pulses outputted is given by: $256 \times 4 = 1024$ pulses/per revolution. These pulses and the 256-wave/revolution COS and SIN waves are inputted to the wr-arithmetic circuit 53. The wr-arithmetic circuit 53 will execute the following arithmetic operations:

The arithmetic sequence is performed at predetermined intervals of time $\Delta T$. At timing tn, the number $\Delta P$ of pulses counted within the $\Delta T$(sec) interval is determined. Next, a voltage value of either the COS or the SIN wave is read. Which one is read depends on the timing. That is, as shown at the bottom of FIG. 9, the SIN and COS values are alternatively selected, depending on the particular interpulse region in which tn falls. The reason for alternating reading between the SIN and COS values is to avoid the possibility of an indeterminant reading. For example, between the first two pulses shown at the bottom of FIG. 9, the SIN value will be selected for reading because the SIN value monotonically varies during this period, i.e., each instant of time is associated with a unique value on the SIN curve. This is not true of the COS curve in this time interval. That is, because the COS curve reaches its peak and doubles back during the interval between the first and second pulses, there are two moments within the interval which will yield the same COS value, leading to an indeterminant result.

Next, there are computed a difference $V_1$ between the previously read voltage value at timing tn-1 and a reference value, and a difference $V_2$ between the voltage value now read at timing tn and the same (absolute) reference value. If $V_0$ designates the (constant) voltage width between simultaneous readings of the COS and SIN waves, wr is given by the following formula (1). $V_1$ and $V_2$ are utilized in formula (1) to improve the resolution of the calculation of wr. (The term $V_1 + V_2/V_0$ is equivalent to the fraction of the total time within $\Delta T$ which is not between the first and last detected pulses. See the hatched area of FIG. 9.)

$$wr = \frac{\left( \Delta P + \frac{(V_1 + V_2)}{V_0} \right)}{\Delta T \times 1024} \times 60 (\text{rpm}) \quad (1)$$

The speed detecting circuit 51 is usually incorporated into the interior of the main spindle drive control unit 2.

Figure 10:
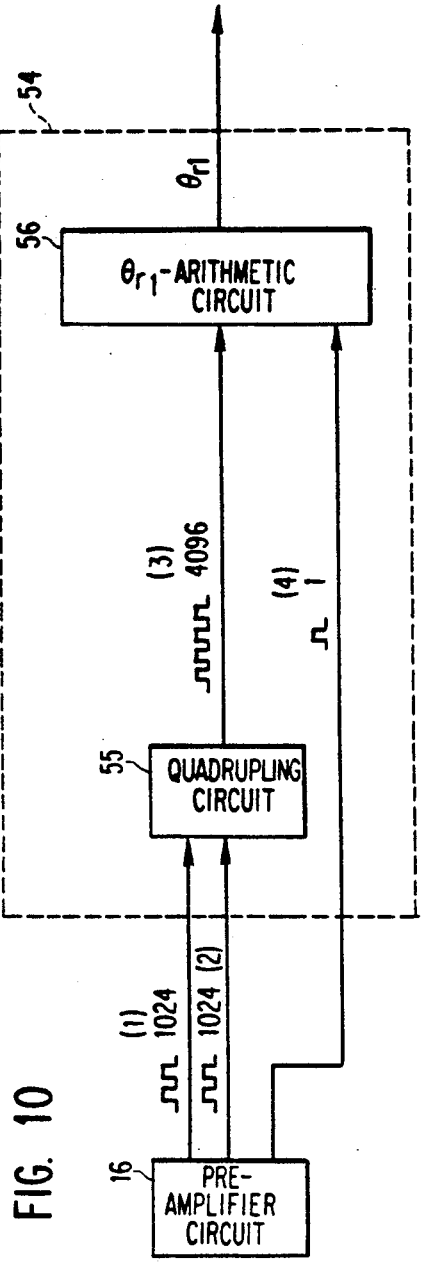
FIG. 10 is a diagram explaining the principles of low resolution position detection.

The manner of obtaining the positional detection value $\theta r_1$ will be elucidated in connection with FIG. 10.

Turning attention to FIG. 10, numeral 54 indicates the low resolution position detecting circuit; 55, a quadrupling circuit; and 56, a $\theta r_1$-arithmetic circuit.

Referring again to FIG. 10, the inputs to the quadrupling circuit 55 are the 1024-pulse/revolution square waves of the pre-amplifier circuit 16, (other outputs of circuit 16 are again omitted for clarity), which are out of phase by 90°. These pulses are processed to produce a $1024 \times 4 = 4096$-pulse/revolution signal.

These pulses and the 1-pulse/revolution (Z-phase) signal are input to the $\theta r_1$-arithmetic circuit 56. The arithmetic entails the use of counter values stored in the $\theta r_1$-arithmetic circuit 56.

A counter value Co at the leading edge of the first Z-phase pulse after initiating the arithmetic operation is stored, and the position thereof is set as an origin point, i.e., $\theta r_1 = 0°$. Thereafter, the position $\theta r_1$ at each reading time is given by:

$\theta r_1 = (\text{counter value} - C_o) / 4096 \times 360$ (degrees)

A position detection value similar to $\theta r_1$ can also be attained by employing the output pulses of the pulse generating circuit 52 depicted in FIG. 9 and the Z-phase signal output concurrently with the 256-wave/revolution COS and SIN waves.

The low resolution position detecting circuit 54 is in general incorporated into the interior of the main spindle drive control unit 2.

The manner in which the positional detection value $\theta r_2$ is obtained will be explained with reference to FIG. 11.

Figure 11:
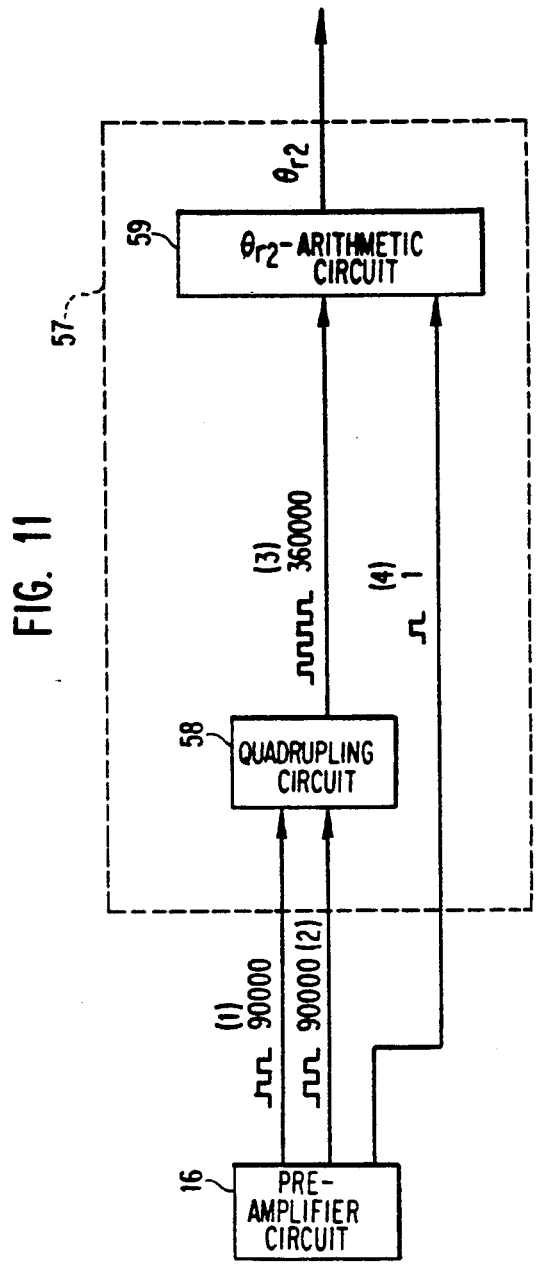
FIG. 11 is a diagram explaining the principles of high resolution position detection.

Referring to FIG. 11, numeral 57 represents a high resolution position detecting circuit; 58, a quadrupling circuit; and 59, an $\theta r_2$-arithmetic circuit. The method of computing the value $\theta r_2$ is much the same as that of the value $\theta r_1$ except that the numbers of pulses are different, and therefore a detailed description is omitted herein.

A description of the overall function of the present invention will now be given.

The built-in main spindle motor 11 is driven in response to, e.g., the speed command wr* of the numerical control unit 1 through the main spindle control unit 2, thereby rotating the main spindle 7. The hollow detected-bodies 12 and 14 attached to the main spindle 7 are thereby rotated, and the outputs of the sensors 13 and 15 are received by the pre-amplifier circuit 16, from which the plurality of waveforms explained in FIGS. 2 and 5 are output. In the case of the speed command wr*, the COS and SIN waves of 256-waves/revolution are input to the main spindle drive control unit 2, and wr is computed in the speed detecting circuit 51, to thereby establish a speed loop.

On the other hand, when a positional command $\theta r^*$ is sent from the numerical control unit 1 to the main spindle drive control unit 2, the main spindle drive control unit 2 receives the Z-phase signal and the 1024-pulse/revolution 2-phase square waves, which are out of phase by 90°, or the Y-phase signal and the 90,000-pulse/revolution 2-phase square waves, which are similarly out of phase by 90°. Subsequently, the positional detection value $\theta r_1$ (or $\theta r_2$) is computed in the position detecting circuit 54 (or 57), thus completing a positional loop.

Figure 4:
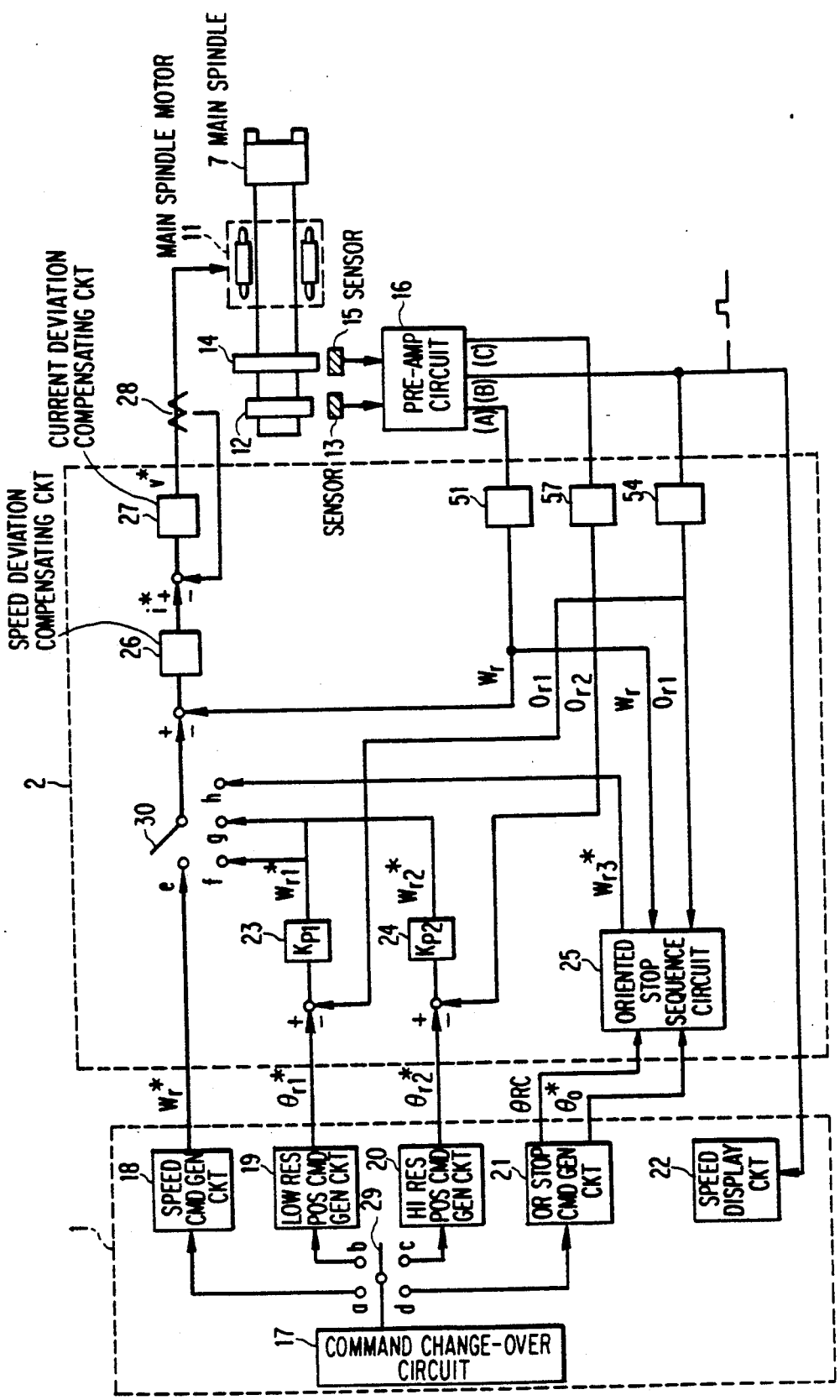
FIG. 4 is a block diagram showing the construction of the control units according to the present invention.

The actual operation of the speed control loop and the positional control loop will now be described with reference to FIG. 4. FIG. 4 is a block diagram depicting the interior control configurations, relative to the present invention, of the numerical control unit 1 and the main spindle drive control unit 2 shown in FIG. 1.

First, the various elements of FIG. 4 will be described. Numeral 17 denotes a command change-over circuit for changing the command mode of the command sent to the main spindle drive control unit 2. At 18 is a speed command generating circuit for generating and sending a speed command wr* to the main spindle drive control unit 2. At 19 is a low resolution position command generating circuit for sending a main spindle positional command $\theta r_1^*$ of low resolution to the main spindle drive control unit 2; and at 20 is a high resolution position command generating circuit for outputting a main spindle position command $\theta r_2^*$ of high resolution to the main spindle drive control unit 2. Numeral 21 indicates an oriented step command generating circuit for outputting a stop position command $\theta o^*$ and an oriented stop command ORC to the main spindle drive control unit 2. At 22 is a speed display circuit for displaying the speed of the main spindle on a CRT, the speed being calculated from the amount of variation in output waveforms (B) within a unit time. The waveforms (B) are input from the pre-amplifier 16 (see FIG. 5). A low resolution position loop gain circuit 23 outputs a speed command wr$_1$* by multiplying the deviation between the low resolution position command $\theta r_1^*$ and the low resolution position detection value $\theta r_1$ by a gain kp$_1$. A high resolution position loop gain circuit outputs a speed command wr$_2$* by multiplying the deviation between the high resolution position command $\theta r_2^*$ and the high resolution position detection value $\theta r_2$ by a gain kp$_2$. An oriented stop sequence circuit 25 effects sequence control to stop the main spindle at a desired position, the sequence control involving the steps of receiving the oriented stop command ORC and the stop position command $\theta o^*$ and inputting the low resolution positional detection value $\theta r_1$ or the speed command value wr. A speed deviation compensating circuit 26 outputs a current command i* by performing compensation arithmetic using the deviation between each speed command and the speed detection value wr. Current deviation compensating circuit 27 outputs a voltage command v* obtained by performing compensation arithmetic using the deviation between the current command i* and the detected current value i of the motor. A current detector 28 detects the actual motor current. Finally, a command change-over switch 29 selects one of the command generating circuits 18-21 according to the output of a command change-over circuit 17, and a speed command change-over switch 30 selects an appropriate speed command in response to the command generating circuit 17.

The description will next deal with the operations performed when each of the respective command generating circuits 18-21 is selected.

(1) The case where the speed command generating circuit 18 is selected

Initially, the command change-over switch 29 is set to position a in conformity with the command of the command generating circuit 17, and, simultaneously, the speed command circuit change-over switch 30 is set to position e.

Next, the speed command generating circuit 18 outputs a speed command wr* to set the desired speed of the main spindle 7. There is formed a speed control loop in which the main spindle drive control unit 2 performs control so as to zero the deviation between wr* and the output wr of the speed detecting circuit 51. This mode is selected in ordinary lathe turning.

(2) The case where the low resolution position command generating circuit 19 is selected Initially, the command change-over switch 29 is set to position b in accordance with a command issued by the command generating circuit 17, and at the same time the speed command circuit 30 is set to position f.

Next, the low resolution position command generating circuit 19 outputs a position command $\theta r_1^*$ for the main spindle. The main spindle drive control unit 2 executes control so as to zero the positional deviation, this control requiring the steps of generating a speed command wr$_1$* obtained by multiplying the deviation between $\theta r_1^*$ and the output $\theta r_1$ of the low resolution position detecting circuit 54 by a positional loop gain kp$_1$ and zeroing the deviation between wr$_1$* and the output wr of the speed detecting circuit 51. Thus, a low resolution positional loop including a speed loop as a minor loop is formed. This mode is selected, as noted previously, for the purpose of effecting position-synchronous operations with spindles other than the main spindle (e.g., X, Y or Z axis spindles, a rotary tool spindle or a second opposed main spindle). FIG. 6 shows several examples of such position-synchronous operations.

Referring to FIG. 6, the numeral 43 represents a cutter fitting jig; 44, a cutting tool; 45, a cylindrical workpiece; 46, a rotary tool spindle; 47 a rotary tool; 48, a second main spindle and chuck; and 49, a workpiece being transferred between the opposed chucks.

Figure 6A:
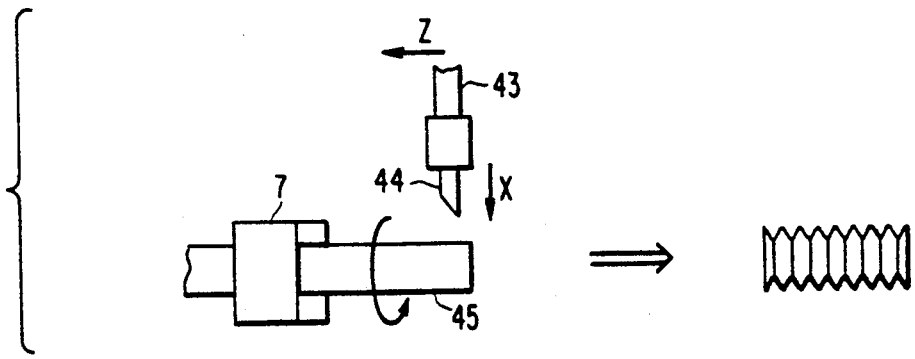
FIGS. 6A, 6B, and 6C are diagrams showing machining examples using the low resolution position detection arrangement according to the present invention.
Figure 6B:
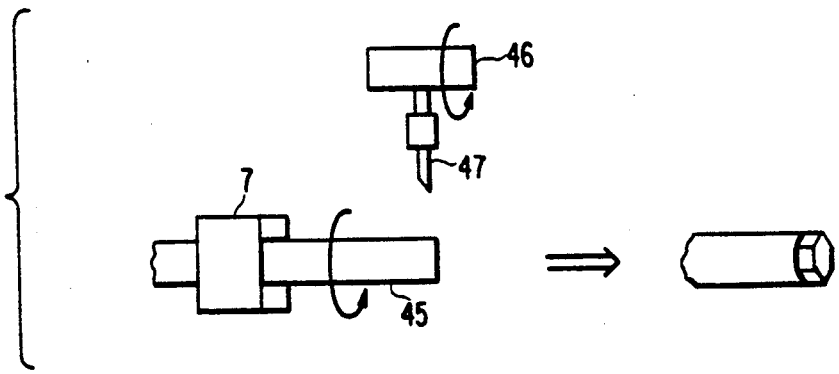
Figure 6C:
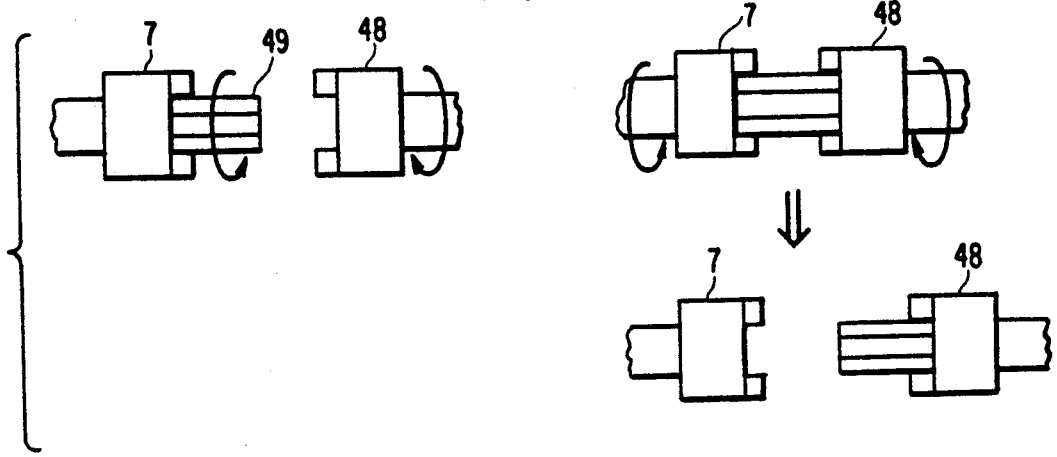

FIG. 6(a) illustrates an example where a screw cutting process is effected on a cylindrical workpiece by performing a position-synchronous operation with coordination among the main spindle and a Z-spindle (i.e., movement along the Z-axis). FIG. 6(b) illustrates an example where a polygonal cutting process (polygon machining) is effected while carrying out a position-synchronous operation requiring coordination between the main spindle and the rotary tool spindle. FIG. 6(c) shows an example where a workpiece is transferred from the chuck of the main spindle to that of an opposed auxiliary spindle, where further operations on the workpiece will be performed. The spindles may rotate in synchronism during the transfer.

The arrows in FIG. 6 indicate the directions of the synchronous operations of the individual spindles. A detailed description of the respective machining methods will be omitted herein because they will be obvious to the operator. Each of the above-described machining operations can be attained by creating position-synchronous programs for controlling a plurality of spindles including the main spindle, using the numerical control unit 1.

(3) The case where the high resolution position detecting circuit 20 is selected Initially, the command change-over switch 29 is set to position c in conformity with a command issued from the command generating circuit 17, and concurrently the speed command circuit 30 is set to g.

The high resolution position command generating circuit 20 outputs the position command $\theta r_2^*$ for the main spindle 7. The main spindle drive control unit 2 carries out control to render the positional deviation zero, which involves the step of issuing a speed command $wr_2^*$ obtained by multiplying the deviation between $\theta r_2^*$ and the output $\theta r_2$ of the high resolution position detecting circuit 57 by a positional loop gain $kp_2$ and the step of zeroing the deviation between $wr_2^*$ and the output $wr$ of the speed detecting circuit 51. Namely, a high resolution positional loop including a speed loop as a minor loop is formed. This mode is selected during C-axis operations which require accuracy as high as 1/1,000 degree.

FIG. 7 specifically shows a machining example involving a C-axis operation.

Turning to FIG. 7, the numeral 45 indicates a cylindrical workpiece; 49 is a rotary tool spindle; and 50 is a drill.

Figure 7A:
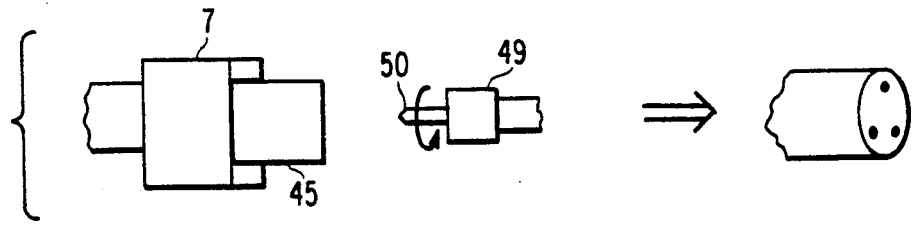
FIGS. 7A, 7B, and 7C are diagrams showing examples of machining using the high resolution positional detection arrangement according to the present invention.
Figure 7B:
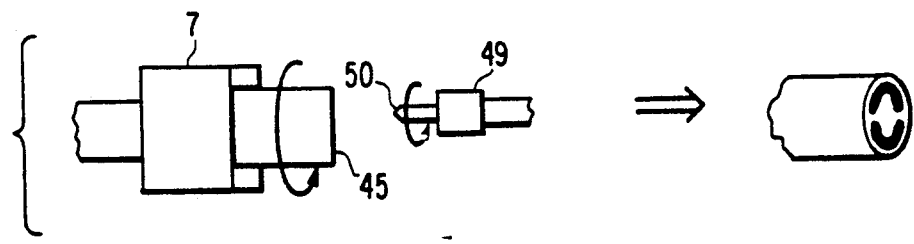
Figure 7C:
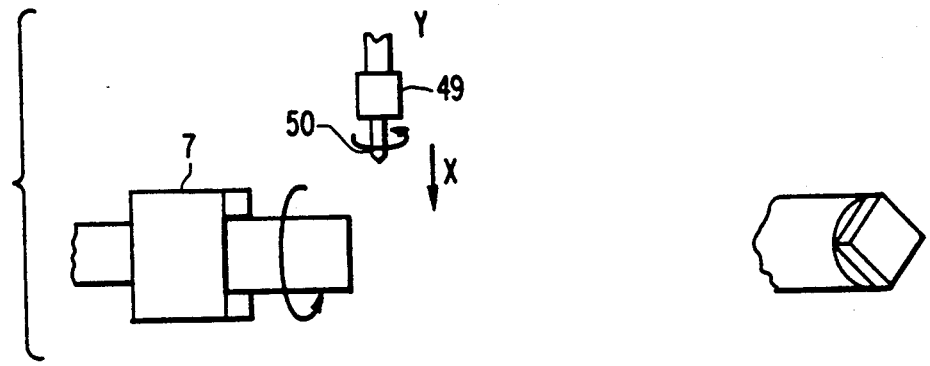

FIG. 7(a) illustrates an example where a drilling process is effected at 120° intervals by use of the rotary tool after a high accuracy position stop has taken place. FIG. 7(b) depicts an example where drill cutting is carried out while rotating the workpiece. FIG. 7(c) shows an example in which a square shaping process is performed while position-synchronizing the C-axis motion with that of other spindles (X-axis and Y-axis motions). The machining in FIG. 7(c) is fundamentally the same as that of FIG. 6(b). The C-axis operation is, however, adopted for processes requiring highly accurate finishing.

(4) The case where the oriented stop command generating circuit 21 is selected The command change-over switch 29 is set to d on the basis of a command from the command generating circuit 17, and, at the same moment, the speed command circuit change-over switch 30 is set to h.

Next, the oriented stop command generating circuit 21 functions to automatically perform sequence-control, employing the oriented stop sequence circuit 25. The circuit 25 reads both the output $wr$ of the speed detecting circuit 51 and the output $\theta r_1$ of the low resolution position detecting circuit 54 and imparts a speed command $wr_3^*$ which will drop to zero as the desired final position $\theta_0$ is reached, thereby effecting an oriented stop operation.

This sequence will be described in more detail in connection with FIG. 8.

Figure 8:
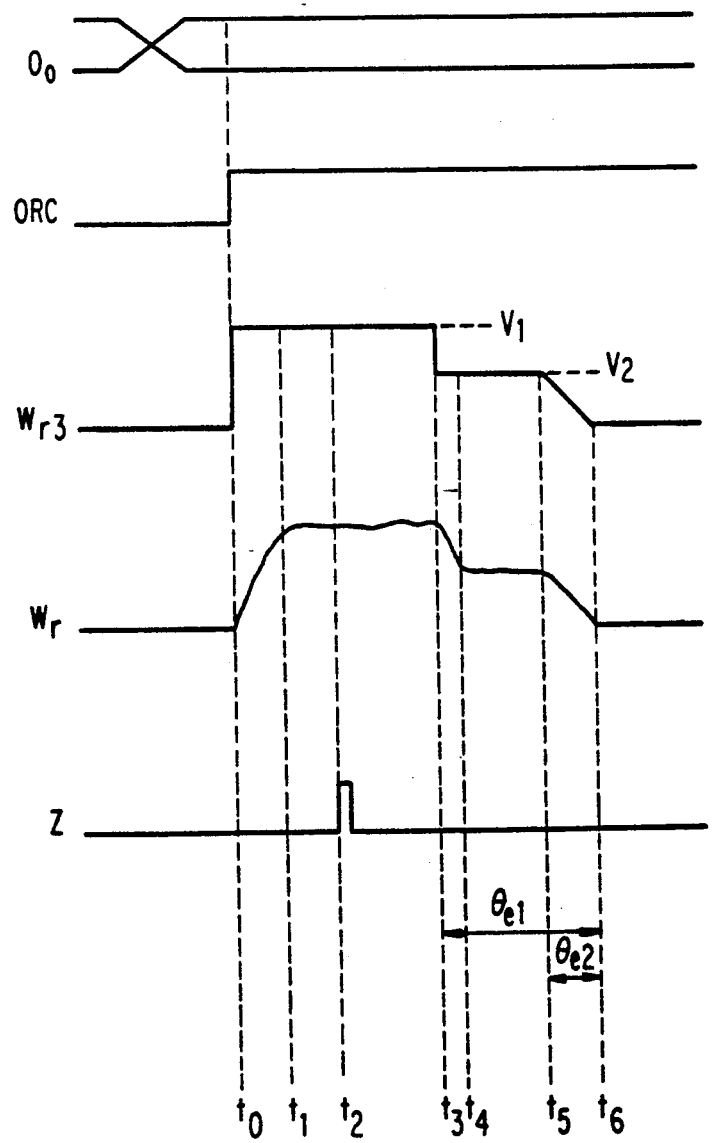
FIG. 8 is a diagram illustrating an oriented stop sequence according to the present invention.

In FIG. 8, when an oriented stop command ORC is output from the oriented stop command generating circuit 21 at time $t_0$, the oriented stop sequence circuit 25 provided in the main spindle drive control unit 2 acts to read and store a stop position command $\theta_0^*$, and simultaneously outputs an orient speed command $V_1^*$ of, e.g., approximately 200 rpm as a speed command $wr_3^*$. The actual speed $wr$ reaches the commanded speed $V_1^*$ at timing $t_1$. At timing $t_2$, detection of the positional value $\theta r_1$ is initiated in synch with the Z-phase signal output by the pre-amplifier circuit 16 via the low resolution position detecting circuit 54. As soon as $\theta r_1$ reaches a certain deviation $\theta e_1$ (a first decelerating point) from the target position at a timing $t_3$, the oriented stop sequence circuit 25 changes-over to a creep speed command $V_2^*$ of e.g., about 30 rpm as a speed command $wr_3^*$. The actual speed $wr$ reaches to the creep speed $V_2^*$ at timing $t_4$. When $\theta r_1$ reaches a deviation $\theta e_2$ (a second decelerating point) from the target position at timing $t_5$, the oriented stop sequence circuit 25 effects change-over to a diminishing speed command $wr_3^*$ given by:

$$wr_3^* = \frac{(\theta_0^* - \theta r_1) \times V_2^*}{\theta e_2} \quad (2)$$

When reaching the target position at timing $t_6$, the relation $\theta_0^* - \theta r_1 = 0$ is established. Hence, formula 2 reduces to $wr_3 = 0$, completing the oriented stop.

The oriented stop mode is executed with the intention of positioning the spindle or the workpiece for replacement of tools, and machining by the insertion of knock pins. The oriented stop commands ORC and $\theta_0^*$ were omitted in FIGS. 1 and 3 for clarity.

As discussed above, hollow detected-bodies 12 and 14 are attached directly to the main spindle 7. With this arrangement, the mechanical structure can be simplified, and the speed and position of the main spindle can also be detected with high accuracy. The sensor signals generated corresponding to the motions of the hollow detected-bodies 12 and 14 are received by the pre-amplifier circuit 16, wherein the signals are waveform-shaped into a plurality of sine waves and square waves. The hollow detected-bodies can take the shape of gear-like members having a number of teeth in proportion to the number of cycles of the sensor signals per revolution of the spindle. Under certain circumstance, only the sine waves are selected according to the application, or only the square waves are selected, or both waves may be selected in some cases. Thus, there is produced a flexible system which can easily adapt to different machining requirements.

What is claimed is:

1. A speed and position control system for a rotatable element, comprising;
    a rotatable element;
    sensor means located adjacent said rotatable element;

at least one detected element fixed directly to said rotatable element and detected by said sensor means;

said sensor means generating a first signal having a periodicity of once per revolution of said rotatable element, a second sinusoidally varying signal having a plurality of cycles per revolution of said rotatable element, and a third sinusoidally varying signal having the same plurality of cycles per revolution of said rotatable element as said second signal but being out of phase with respect to said second signal;

waveform shaping means for converting said second and third signals into pulse signal trains, and for outputting said converted signals along with said second and third signals; and means for controlling the speed or position of said rotary element, said controlling means employing at least said second and third signals for speed control and at least said converted signals for position control.

2. A system as claimed in claim 1, wherein said rotatable element comprises a spindle of a numerically controlled lathe.

3. A system as claimed in claim 1, wherein said second signal is a sine-wave signal and said third signal is a cosine-wave signal differing in phase by 90 degrees from said second signal.

4. A system as claimed in claim 1, wherein said waveform shaping means includes means for converting said first signal into a pulse signal.

5. A system as claimed in claim 1, wherein said converted signals comprise pulse signals having a periodicity which is a multiple of that of said second and third signals.

6. A system as claimed in claim 1, wherein said sensor means comprises a single sensor having multiple sensor outputs and the number of detected elements is one.

7. A system as claimed in claim 1, wherein said detected element comprises a gear-like member having a number of teeth in proportion to the number of said plurality of cycles per revolution of said rotatable element.

8. A system as claimed in claim 1, wherein said detected elements are two in number, and said sensor means comprises a pair of sensors, one disposed adjacent each detected element.

9. A system as claimed in claim 8, wherein said detected elements comprise gear-like members having a number of teeth in proportion to the number of said plurality of cycles per revolution of said rotatable element, a second one of said detected elements having a substantially greater number of teeth than a first of said detected elements.

10. A system as claimed in claim 8, wherein said sensor means further generates a fourth sinusoidally varying signal having a second plurality, greater than said first plurality, of cycles per revolution of said rotatable element, and a fifth sinusoidally varying signal having said second plurality of cycles per revolution of said rotatable element but being out of phase with respect to said fourth signal, said waveform shaping means including means for converting said fourth and fifth signals into pulse signal trains, said controlling means employing the pulse signal trains thus converted for high resolution position control.

11. A system as claimed in claim 10, wherein said waveform shaping means includes means for generating said second pulse signal trains such that a periodicity of said pulse signals is a multiple of that of said fourth and fifth signals.

12. A system as claimed in claim 1, wherein said controlling means includes means for generating at least speed and position command signals; a first control loop receiving said speed command signal as an input and including a first feedback loop responsive to said second and third signals; a second control loop receiving a first, low resolution position command signal as an input and including a second feedback loop responsive to said converted signals and further including said first feedback loop as a minor loop; and a third control loop receiving oriented stop position command signals and including means for generating a loop speed command signal in response to both said second and third signals and said converted signals, said third control loop including said first feedback loop as a minor loop.

13. A system as claimed in claim 10, wherein said controlling means includes means for generating at least speed and position command signals; a first control loop receiving said speed command signal as an input and including a first feedback loop responsive to said second and third signals; a second control loop receiving a first, low resolution position command signal as an input and including a second feedback loop responsive to said converted signals and further including said first feedback loop as a minor loop; a third control loop receiving oriented stop position command signals and including means for generating a loop speed command signal in response to both said second and third signals and said converted signals, said third control loop including said first feedback loop; and a fourth control loop receiving a second, high resolution position command signal as an input and including a fourth feedback loop responsive to said second pulse signal trains, said fourth feedback loop including said first feedback loop as a minor loop.

* * * * *